United States Patent
Zhang

(10) Patent No.: US 12,505,813 B2
(45) Date of Patent: Dec. 23, 2025

(54) INTERNET-OF-THINGS TERMINAL AND PICTURE UPDATING METHOD THEREFOR

(71) Applicant: BOE TECHNOLOGY GROUP CO., LTD., Beijing (CN)

(72) Inventor: Ying Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 362 days.

(21) Appl. No.: 18/044,951

(22) PCT Filed: Aug. 16, 2021

(86) PCT No.: PCT/CN2021/112659
§ 371 (c)(1),
(2) Date: Mar. 10, 2023

(87) PCT Pub. No.: WO2022/068431
PCT Pub. Date: Apr. 7, 2022

(65) Prior Publication Data
US 2023/0351976 A1    Nov. 2, 2023

(30) Foreign Application Priority Data
Sep. 29, 2020    (CN) .................. 202011053717.4

(51) Int. Cl.
*G09G 3/34*    (2006.01)
*G09G 3/20*    (2006.01)

(52) U.S. Cl.
CPC ........... *G09G 3/344* (2013.01); *G09G 3/2096* (2013.01)

(58) Field of Classification Search
CPC ................ G09G 3/344; G09G 3/2096; G09G 2370/022; G06F 3/147; G06F 3/14; H04L 67/12
See application file for complete search history.

(56) References Cited

U.S. PATENT DOCUMENTS 9,256,795 B1    2/2016   Gray et al.
2005/0151701 A1  7/2005  Rosander et al.
(Continued)

FOREIGN PATENT DOCUMENTS

CN    1647022 A    7/2005
CN   102169423 A    8/2011
(Continued)

OTHER PUBLICATIONS

Peng, Z., "Design of microcapsule electronic ink and its active dynamic drive device," Master's Thesis, School of Electronics and Communication Engineering, Zhejiang University, Jun. 4, 2012, 60 pages. (Submitted with Partial Translation).

(Continued)

*Primary Examiner* — John R Wallace
(74) *Attorney, Agent, or Firm* — McCoy Russell LLP

(57) ABSTRACT

The present disclosure provides an IoT terminal and a picture updating method therefor, which belong to the field of display technology. The IoT terminal includes: a communicator configured to receive text and picture information; a micro controller coupled with the communicator and configured to convert the text and picture information into a to-be-displayed picture; a storage device coupled with the micro controller and configured to store the to-be-displayed picture; and a display device coupled with the micro controller. The micro controller is further configured to read the to-be-displayed picture from the storage device and write the to-be-displayed picture into the display device for display. The solution of the present disclosure enables the low-power IoT terminal to complete processing of pictures.

11 Claims, 3 Drawing Sheets

(56) References Cited

U.S. PATENT DOCUMENTS

| | | |
|---|---|---|
| 2005/0266590 A1 | 12/2005 | Roh et al. |
| 2009/0219223 A1 | 9/2009 | Rosander et al. |
| 2011/0085224 A1* | 4/2011 | Addington .............. G02F 1/167 |
| | | 445/24 |
| 2011/0141139 A1 | 6/2011 | Mittan et al. |
| 2018/0341450 A1 | 11/2018 | Nade |
| 2020/0029016 A1* | 1/2020 | Tanaka ................. H04N 23/843 |
| 2022/0197023 A1* | 6/2022 | Mihali ................... G06F 1/1626 |

FOREIGN PATENT DOCUMENTS

| | | |
|---|---|---|
| CN | 103412733 A | 11/2013 |
| CN | 105426149 A | 3/2016 |
| CN | 105446683 A | 3/2016 |
| CN | 205564193 U | 9/2016 |
| CN | 106327552 A | 1/2017 |
| CN | 107704224 A | 2/2018 |
| CN | 107766020 A | 3/2018 |
| CN | 108877555 A | 11/2018 |
| CN | 208225472 U | 12/2018 |
| CN | 109933392 A | 6/2019 |
| CN | 110134352 A | 8/2019 |
| CN | 112199060 A | 1/2021 |

OTHER PUBLICATIONS

Guangyi, Y. et al., "Research on display system of multi-touch control electronic ink screen," Experimental Technology and Management, vol. 35, No. 8, Aug. 2018, 6 pages. (Submitted with English Abstract).

"FireBeetle Covers-ePaper Tircolor Display Module SPI," SKU:DFR0531, DF Robot Website, Available Online at https://www.dfrobot.com.cn/goods-1758.html, Available Online at Apr. 3, 2019, 42 pages. (Submitted with Partial Translation).

ISA China National Intellectual Property Administration, International Search Report and Written Opinion Issued in Application No. PCT/CN2021/112659, Oct. 20, 2021, WIPO, 16 pages. (Submitted with English Translation).

* cited by examiner

INTERNET-OF-THINGS TERMINAL AND PICTURE UPDATING METHOD THEREFOR

CROSS REFERENCE TO RELATED APPLICATION

The present application is the U.S. national phase of PCT Application No. PCT/CN2021/112659 filed on Aug. 16, 2021, which claims priority to the Chinese patent application No. 202011053717.4 filed in China on Sep. 29, 2020, entire disclosure of which is incorporated herein by reference.

TECHNICAL FIELD

The present disclosure relates to the field of display technology, and in particular, to an Internet of Things terminal and a picture updating method therefor.

BACKGROUND

In Internet of Things (IoT) applications, an electrophoresis display technology (EPD) terminal is an IoT terminal that uses an electronic ink screen for display. The IoT terminal adopts a low-power EPD screen and uses a micro control unit (MCU) as a controller. The power consumption of the MCU is very low, however, the processing capacity and internal resources of the MCU are limited, and thus the MCU cannot complete processing of pictures.

SUMMARY

A technical problem to be solved by the present disclosure is to provide an Internet of Things terminal and a picture updating method therefor, which can complete processing of pictures.

In order to solve the above technical problem, the embodiments of the present disclosure provide the following technical solutions.

In one aspect, an Internet of Things (IoT) terminal is provided and includes:
 a communicator configured to receive text and picture information;
 a micro controller coupled with the communicator and configured to convert the text and picture information into a to-be-displayed picture;
 a storage device coupled with the micro controller and configured to store the to-be-displayed picture; and
 a display device coupled with the micro controller;
 wherein the micro controller is further configured to read the to-be-displayed picture from the storage device and write the to-be-displayed picture into the display device for display.

In some embodiments, the text and picture information includes base picture information and text information of at least one color;
 the communicator is specifically configured to respectively receive at least one of the base picture information and the text information of at least one color;
 the micro controller is specifically configured to convert the received text information of at least one color into at least one monochrome picture correspondingly, and convert the received base picture information into a base picture;
 the storage device is specifically configured to store the base picture and the at least one monochrome picture; wherein storage areas corresponding to the base picture and the at least one monochrome picture in the storage device are independent of each other, and storage areas corresponding to different monochrome pictures in the at least one monochrome picture are independent of each other;
 the micro controller is further specifically configured to respectively read the base picture and the at least one monochrome picture from the corresponding storage areas in the storage device, synthesize the base picture and the at least one monochrome picture into the to-be-displayed picture, and write the to-be-displayed picture into the display device for display.

In some embodiments, the IoT terminal further includes a font library device coupled with the micro controller; the font library device stores a first display array corresponding to a character; the font library device is configured to receive the character input by the micro controller, and output the first display array corresponding to the character.

In some embodiments, the micro controller further includes an RAM, and the micro controller is specifically configured to,
 for any one color of the text information of at least one color, store the text information received by the communicator in the RAM, and process, one by one, all characters in the any one color of the text information of at least one color, to obtain a monochrome picture of the any one color of the text information of at least one color via convention;
 for each character, obtain a first display array corresponding to the character through the font library device, convert the first display array into a two-dimensional matrix with m rows and n columns, and sequentially write the two-dimensional matrix into storage areas of corresponding colors in the storage device according to each row or each column;
 wherein elements of the two-dimensional matrix are binary; a last column is 0 along a scanning direction for writing data into the display device; and an order of a pixel of the display device corresponding to a starting element of the two-dimensional matrix, along the scanning direction for writing data into the display device, is q times 8, n and m are positive integers, and q is a natural number.

In some embodiments, the micro controller is further specifically configured to, convert a display array corresponding to the character into an initial two-dimensional matrix with m rows and n columns, wherein elements of the initial two-dimensional matrix are binary; in case that a row coordinate k of a pixel of the display device corresponding to a starting element of the initial two-dimensional matrix, is not an integer multiple of 8, move positions of pixels of the display device corresponding to all elements of the initial two-dimensional matrix by n1 pixels to the right as a whole, and filling n1 columns with all 0 elements before the initial two-dimensional matrix and filling (8-n1) columns with all 0 elements after the initial two-dimensional matrix, thereby obtaining the final two-dimensional matrix, wherein n1 is a remainder of dividing k by 8.

In some embodiments, the micro controller is further configured to read, according to each row or each column of the two-dimensional matrix, elements in the two-dimensional matrix corresponding to M pixels, from the storage areas corresponding to different monochrome pictures in the at least one monochrome picture, and write the elements in the two-dimensional matrix corresponding to M pixels into the M pixels of the display device, wherein M is a positive integer.

In some embodiments, the micro controller is coupled with the communicator through a serial peripheral interface; and/or, the micro controller is coupled with the storage device through a serial peripheral interface; and/or, the micro controller is coupled with the display device through a serial peripheral interface; and/or, the micro controller is coupled with the font library device through a serial peripheral interface.

In some embodiments, the storage device adopts a flash memory.

In some embodiments, the display device is an electronic ink screen.

One embodiment of the present disclosure further provides a picture updating method for the above IoT terminal, including:

receiving, by the communicator, text and picture information;

converting, by the micro controller, the text and picture information received by the communicator, into a to-be-displayed picture;

storing, by the storage device, the to-be-displayed picture;

writing, by the micro controller, the to-be-displayed picture from the storage device into the display device for display; and displaying, by the display device, the picture written by the micro controller.

In some embodiments, the text and picture information includes base picture information and text information of at least one color; the method includes:

respectively receiving, by the communicator, at least one of the base picture information and the text information of at least one color;

converting, by the micro controller, the received text information of at least one color into at least one monochrome picture correspondingly, and converting the received base picture information into a base picture;

storing, by the storage device, the base picture and the at least one monochrome picture; wherein storage areas corresponding to the base picture and the at least one monochrome picture in the storage device are independent of each other, and storage areas corresponding to different monochrome pictures in the at least one monochrome picture are independent of each other;

respectively reading, by the micro controller, the base picture and the at least one monochrome picture from the corresponding storage areas in the storage device, synthesizing the base picture and the at least one monochrome picture into the to-be-displayed picture, and writing the to-be-displayed picture into the display device for display.

In some embodiments, the method includes:

for any one color of the text information of at least one color, storing, by the micro controller, the text information received by the communicator in the RAM, and processing, one by one, all characters in the any one color of the text information of at least one color, to obtain a monochrome picture of the any one color of the text information of at least one color;

for each character, obtaining, by the micro controller, a first display array corresponding to the character through the font library device, converting the first display array into a two-dimensional matrix with m rows and n columns, and writing the two-dimensional matrix into storage areas of corresponding colors in the storage device according to each row or each column in turn;

wherein elements of the two-dimensional matrix are binary; a last column is 0 when writing the two-dimensional matrix according to each row, or a last row is 0 when writing the two-dimensional matrix according to each column; and an order of a pixel of the display device corresponding to a starting element of the two-dimensional matrix, along a scanning direction for writing data into the display device, is q times 8, n and m are positive integers, and q is a natural number.

In some embodiments, the method includes:

converting, by the micro controller, a display array corresponding to the character into an initial two-dimensional matrix with m rows and n columns, wherein elements of the initial two-dimensional matrix are binary; in case that a row coordinate k of a pixel of the display device corresponding to a starting element of the initial two-dimensional matrix, is not an integer multiple of 8, moving positions of pixels of the display device corresponding to all elements of the initial two-dimensional matrix by n1 pixels to the right as a whole, and filling n1 columns with all 0 elements before the initial two-dimensional matrix and filling (8-n1) columns with all 0 elements after the initial two-dimensional matrix, thereby obtaining the final two-dimensional matrix, wherein n1 is a remainder of dividing k by 8.

In some embodiments, the method includes:

reading, by the micro controller, according to each row or each column of the two-dimensional matrix, elements in the two-dimensional matrix corresponding to M pixels, from the storage areas corresponding to different monochrome pictures in the at least one monochrome picture, and writing the elements in the two-dimensional matrix corresponding to M pixels into the M pixels of the display device, wherein M is a positive integer.

The embodiments of the present disclosure have the following beneficial effects.

In the above technical solution, the micro controller converts the text and picture information received by the communicator into a to-be-displayed picture, and stores the to-be-displayed picture in the storage device outside the micro controller. After that, the micro controller writes the to-be-displayed picture stored in the storage device into the display device for display. In this embodiment, the picture is stored in the storage device outside the micro controller, and then the picture does not need to occupy resources of the micro controller, so that the micro controller can complete processing of the picture with small resources.

DETAILED DESCRIPTION

In order to make the technical problems to be solved, the technical solutions and the advantages of embodiments of the present disclosure more apparent, the present disclosure will be described in details hereinafter in conjunction with the drawings and embodiments.

Near-field wireless communication is mostly used between IoT terminals and gateways. One gateway sends, through a wired network or a mobile network, information reported by an IoT terminal to a server. The server sends information to the IoT terminal for displaying it on the IoT terminal. A specific application of the IoT terminal may be a hospital bedside card. The bedside card is located beside a hospital bed and used to display patient information. Another specific application of the IoT terminal may be a name badge terminal which is used to display doctor information. Another specific application of the IoT terminal may be a ward number plate which is used to display corresponding information in a ward. The information displayed on the IoT terminal is sent to the IoT terminal through the server-gateway.

The IoT terminal is a low-power device and usually uses MCU as a controller. The power consumption of the MCU is very low, however, the processing capacity and internal resources of the MCU are limited, and thus the MCU cannot complete processing of pictures. Taking a bedside card as an example, a picture resolution of the bedside card is 800×480 and a file size is about 96K bytes, but a storage space of a random access memory (RAM) of the MCU is only 20K bytes, and thus the MCU is completely incapable of picture processing.

Embodiments of the present disclosure provide an Internet of Things (Iot) terminal and a picture updating method thereof, which can complete processing of pictures.

Figure 1:
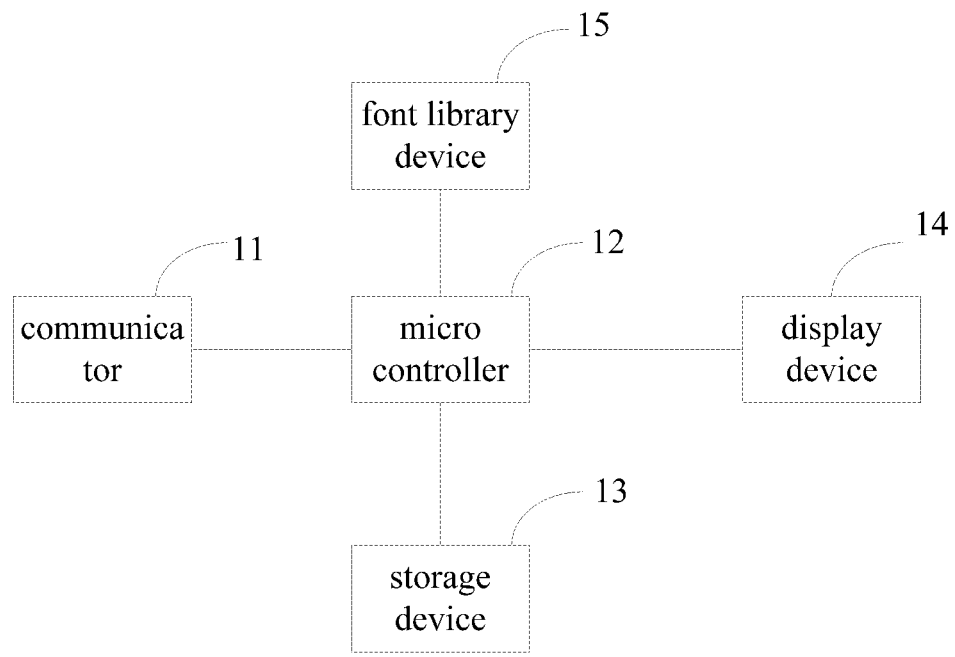
FIG. 1 is a schematic diagram of an IoT terminal according to an embodiment of the present disclosure.

One embodiment of the present disclosure provides an IoT terminal, as shown in FIG. 1, including:
- a communicator 11 configured to communicate with an external device to receive text and picture information; where the communicator 11 may receive the text and picture information through radio frequency, Bluetooth and other wireless means, and may also receive the text and picture information through wired means;
- a micro controller 12 coupled with the communicator 11 and configured to convert the text and picture information into a to-be-displayed picture;
- a storage device 13 coupled with the micro controller 12 and configured to store the to-be-displayed picture;
- a display device 14 coupled with the micro controller.

The micro controller 12 is further configured to read the to-be-displayed picture from the storage device 13 and write it into the display device 14 for display.

In this embodiment, the micro controller 12 converts the text and picture information received by the communicator 11 into a to-be-displayed picture, and stores the to-be-displayed picture in the storage device 13 outside the micro controller 12. After that, the micro controller 12 writes the to-be-displayed picture stored in the storage device 13 into the display device 14 for display. In this embodiment, the picture is stored in the storage device 13 outside the micro controller 12, and then the picture does not need to occupy resources of the micro controller 12, so that the micro controller 12 can complete processing of the picture with small resources.

In a specific example, the communicator 11 may be a radio frequency chip, which may communicate with a gateway wirelessly and receive text and picture information via interaction between the gateway and a server. The gateway can perform near-field wireless communication, has a wireless network or a wired network, and can connect to the server.

The storage device 13 is configured to storage information and cache information in the process of processing the text and picture information. The storage device 13 may adopt various types of storage devices. In some embodiments, the storage device 13 may adopt a flash memory, which can maintain the stored information for a long time without powering on. The flash memory is of electrically erasable programmable read-only memory (EEPROM) type, which has a high access speed, is easy to erase and rewrite, and consumes little power, and thus is suitable for IoT terminals with low power consumption requirements. Of course, the storage device 13 is not limited to using a flash memory, and the storage device 13 may also adopt other types of erasable and programmable storage devices.

In some embodiments, the display device 14 is an electronic ink screen. The power consumption of the electronic ink screen is very low, which is suitable for IoT terminals with low power consumption requirements. Of course, the display device 14 is not limited to using an electronic ink screen, and the display device 14 may adopt other types of low power consumption display devices.

Near-field wireless communication is mostly used between IoT terminals and gateways. Usually, the near-field wireless communication uses a lower frequency to expand the range of action, and the communication speed is slow, and thus information sent by the server-gateway is mostly text information. Then the MCU in the IoT terminal synthesizes base picture information and the text information, to display on the display device 14. Therefore, as shown in FIG. 1, the IoT terminal further includes a font library device 15 configured to store a first display array corresponding to the text information. The font library device 15 may read a first display array of corresponding information through ASCII codes and GB2312 codes of a character or text. The first display array is configured to indicate how many pixels of the display device need to display a character or text, and whether these pixels are lit when displaying the character or text. When displaying a character or text, many dots are combined in a certain way; and the font library device 15 can translate different characters or texts into a dot array, i.e., first display array.

In this embodiment, the micro controller 12 may be coupled with the communicator 11 through a serial peripheral interface. The micro controller 12 may be coupled with the storage device 13 through a serial peripheral interface (SPI). The micro controller 12 may be coupled with the display device 14 through a serial peripheral interface. The micro controller 12 may be coupled with the font library device 15 through a serial peripheral interface. The serial peripheral interface is a synchronous peripheral interface, which enables the micro controller 12 to communicate with various peripheral devices in a serial manner to exchange information.

In some embodiments, the text and picture information includes base picture information and text information of at least one color. The base picture information represents a basic picture, which can display graphics and texts in different colors. Texts and graphics in different colors can be displayed at different positions of the base picture, thereby realizing display of information. The base picture information is usually fixed, and has a very small probability of being changed. A picture can be updated by updating text information on the base picture subsequently. The text information of at least one color is text information that needs to be updated subsequently, and the text information may include texts and graphics.

The communicator 11 is specifically configured to respectively receive at least one of the base picture information and the text information of at least one color; where respectively receiving may be performed in sequence or without sequence.

The micro controller 12 is specifically configured to convert the received text information of at least one color into at least one monochrome picture correspondingly, and convert the received base picture information into a base picture.

The storage device 13 is specifically configured to store the base picture and the at least one monochrome picture. Storage areas corresponding to the base picture and the at least one monochrome picture in the storage device are independent of each other. Storage areas corresponding to different monochrome pictures in the at least one monochrome picture are independent of each other.

The micro controller 12 is further specifically configured to respectively read the base picture and the at least one monochrome picture from the corresponding storage areas in the storage device, synthesize the base picture and the at least one monochrome picture into a to-be-displayed picture, and write the to-be-displayed picture into the display device for display. In this way, the effect of superimposing texts on a picture can be achieved.

In some embodiments, the micro controller 12 further includes an RAM, and the micro controller 12 is specifically configured to, for any one color of the text information of at least one color, store the text information received by the communicator in the RAM, and process, one by one, all characters in the any one color of the text information of at least one color, to obtain a monochrome picture of the any one color of the text information of at least one color;

for each character, obtain a first display array corresponding to the character through the font library device, convert the first display array into a two-dimensional matrix with m rows and n columns, and sequentially write the two-dimensional matrix into storage areas of corresponding colors in the storage device according to each row or each column;

where elements of the two-dimensional matrix are binary; the last column is 0 when writing the two-dimensional matrix according to each row, or the last row is 0 when writing the two-dimensional matrix according to each column; and an order of a pixel of the display device corresponding to a starting element of the two-dimensional matrix, along a scanning direction for writing data into the display device, is q times 8, n and m are positive integers, and q is a natural number.

In some embodiments, the micro controller 12 is further specifically configured to, convert a display array corresponding to the character into an initial two-dimensional matrix with m rows and n columns, where elements of the initial two-dimensional matrix are binary; in case that a row coordinate k of a pixel of the display device corresponding to a starting element of the initial two-dimensional matrix, is not an integer multiple of 8, move positions of pixels of the display device corresponding to all elements of the initial two-dimensional matrix by n1 pixels to the right as a whole, and filling n1 columns with all 0 elements before the initial two-dimensional matrix and filling (8-n1) columns with all 0 elements after the initial two-dimensional matrix, thereby obtaining the final two-dimensional matrix, where n1 is a remainder of dividing k by 8.

In some embodiments, the micro controller 12 is further configured to read, according to each row or each column of the two-dimensional matrix, elements in the two-dimensional matrix corresponding to M pixels, from the storage areas corresponding to different monochrome pictures in the at least one monochrome picture, and write the elements in the two-dimensional matrix corresponding to M pixels into the M pixels of the display device, where M is a positive integer.

The M pixels may be all pixels of the display device 14, or may be part of the pixels of the display device 14.

Figure 2:
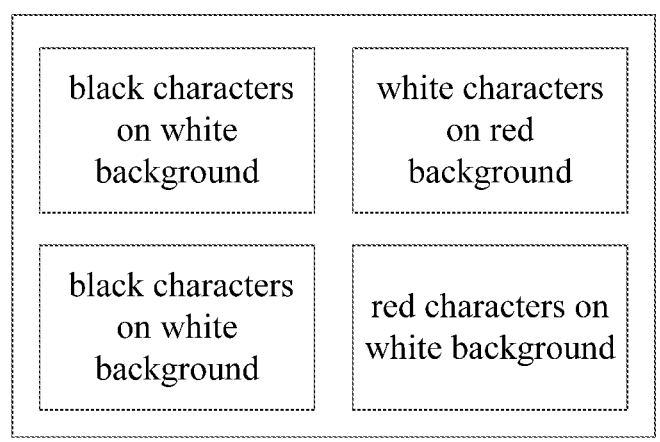
FIG. 2 is a schematic diagram showing displaying of a bedside card.

In a specific example, the storage device 13 adopts a flash memory, and the IoT terminal is a bedside card as shown in FIG. 2. As shown in FIG. 2, the bedside card is divided into several areas, including: an area with black characters on a white background, an area with white characters on a red background, an area with black characters on a white background, and an area with red characters on a white background. The characteristic of the flash memory is that once it is written, it cannot be erased; when it is erased, it must be erased as a whole. Therefore, in this embodiment, a color separation processing method is adopted, so that text and picture information of the bedside card is divided into base picture information and three-color text information. The base picture information includes a white background area and a red background area. The three-color text information includes black text information, white text information and red text information. Correspondingly, the flash memory is divided into four storage areas, which are respectively configured to store the base picture information, the black text information, the white text information and the red text information.

The bedside card can interact with a gateway and a server through the communicator 11, and receive information issued by the server and the gateway. The information issued by the server and the gateway to the bedside card is divided into base picture information and text information. When the server and gateway send the base picture information, the bedside card enters a base picture receiving mode and directly stores the base picture information as a base picture in a corresponding storage area in the flash memory. Since the base picture information is usually fixed and has a very small probability of being changed, the bedside card mainly receives text information. When the server and gateway send text information, the bedside card enters a text information receiving mode, converts the text information into a to-be-displayed monochrome picture, and stores the converted monochrome picture in a corresponding storage area of the flash memory. For example, after the bedside card receives black text information, the bedside card can convert the black text information into a black picture and store it in a corresponding storage area in the flash memory; after the bedside card receives red text information, the bedside card can convert the red text information into a red picture and store it in a corresponding storage area in the flash memory; after the bedside card receives white text information, the bedside card can convert the white text information into a white picture and store it in a corresponding storage area in the flash memory.

The base picture includes three different colors: black, white and red, then every two bits in the base picture information can represent a color, for example, 00 means black, 01 means white, and 10 means red. For white pictures, black pictures and red pictures, each of them only includes one color, so one pixel can be represented by one bit for indicating whether the corresponding pixel displays this color. For example, for a white picture, when a bit corresponding to a pixel is 1, it means that the corresponding pixel displays white; and when a bit corresponding to a pixel is 0, it means that the corresponding pixel does not display white. For a black picture, when a bit corresponding to a pixel is 1, it means that the corresponding pixel displays black; when a bit corresponding to a pixel is 0, it means that the corresponding pixel does not display black. For a red picture, when a bit corresponding to a pixel is 1, it means that the corresponding pixel displays red; when a bit corresponding to a pixel is 0, it means that the corresponding pixel does not display red.

When the bedside card receives text information, the bedside card first erases the corresponding area in the flash memory, and then converts GB2312 codes of the text information into a two-dimensional matrix through the font library device 15. Then, the bedside card fine-tunes the two-dimensional matrix according to layout of the base picture to realize adjustment by bit, and then writes the adjusted two-dimensional matrix into the storage areas of the corresponding colors row by row. In this way, the text information of different colors is written into the storage areas of the corresponding colors, respectively.

Specifically, taking black text information as an example, when the MCU stores the received black text information in RAM, the MCU first processes a first character, i.e., according to GB2312 codes or ASCII codes of the character, obtaining a first display array of the character through an interface with the font library device 15, and converting the first display array into a two-dimensional matrix, where elements of the two-dimensional matrix are binary. For example, the first display array is:

$$FF \quad 00 \quad 01$$
$$FF \quad 00 \quad 01$$
$$FF \quad 00 \quad 01$$

The elements of the first display array are in hexadecimal. The converted initial two-dimensional matrix is:

$$11111111 \quad 00000000 \quad 00000001$$
$$11111111 \quad 00000000 \quad 00000001$$
$$11111111 \quad 00000000 \quad 00000001$$

The elements in the initial two-dimensional matrix are binary, and one bit corresponds to one pixel of the display device. When writing the two-dimensional matrix into the flash memory, it needs to be written in bytes. Therefore, the number of elements in each row or column should be a multiple of 8. If the number of elements in each row or column is not a multiple of 8, the first display array needs to be expanded. For example, for an initial two-dimensional matrix with m rows and n columns, when horizontal scanning is used in the EPD, in case that a row coordinate k of a pixel of the display device corresponding to a starting element of the initial two-dimensional matrix, is calculated according to layout information and is not an integer multiple of 8, the elements of the initial two-dimensional matrix are moved to the right by n bits to form a new two-dimensional matrix. The new two-dimensional matrix is divided into m second display arrays by row, and the m second display arrays are written into storage areas of corresponding colors in the flash memory, respectively. At this point, the processing of the first character is completed. And so on, after all characters are processed, a black picture is obtained.

For example, a first display array is:

$$0X3F \quad 0X00$$
$$0X0F \quad 0X00$$
$$0X0F \quad 0X00$$
$$0X0F \quad 0X00$$
$$0X0F \quad 0X00$$
$$0XFF \quad 0XF0$$

Where 0X is hexadecimal; and the first display array is 6 rows and 2 columns, and can be used to display the character "1".

After converting the first display array into an initial two-dimensional matrix, the initial two-dimensional matrix is:

$$00111111 \quad 00000000$$
$$00001111 \quad 00000000$$
$$00001111 \quad 00000000$$
$$00001111 \quad 00000000$$
$$00001111 \quad 00000000$$
$$11111111 \quad 11110000$$

Where each bit corresponds to one pixel of the display device.

An element "0" in the first row and first column of the initial two-dimensional matrix is a starting element of the initial two-dimensional matrix. According to layout information, when displaying, in case that a horizontal coordinate of a pixel corresponding to the starting element is an integer multiple of 8, when being written to the storage area or display device, the hexadecimal display array can be directly written in rows. For example, coordinates of a pixel corresponding to the starting element in the display device are (8, 1), when being written to the storage area or display device, the hexadecimal display array can be directly written in rows. Then, coordinates of a starting pixel of the display device are (0,0).

Figure 5:
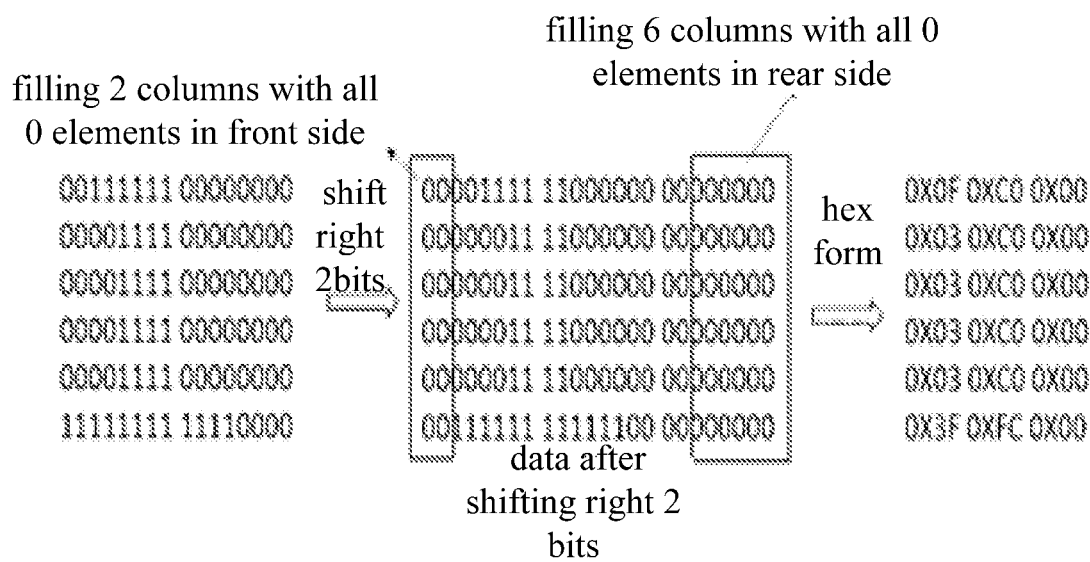
FIG. 5 is a schematic diagram of right-moving a two-dimensional matrix according to an embodiment of the present disclosure.

According to layout information, when displaying, in case that a horizontal coordinate k of a pixel corresponding to the starting element of the initial two-dimensional matrix is not an integer multiple of 8, elements of the initial two-dimensional matrix need to be shifted to the right. For example, k=10, the elements of the initial two-dimensional matrix need to be shifted to the right by 2 bits as a whole, with filling 2 columns with all 0 elements before the initial two-dimensional matrix and filling 6 columns with all 0 elements after the initial two-dimensional matrix, thereby obtaining a new two-dimensional matrix as shown in FIG. 5. When the new two-dimensional matrix is expressed in hexadecimal, it can be expressed as a display array shown in the right half of FIG. 5. When being written to the storage area or display device, the display array shown in the right half of FIG. 5 can be directly written by rows, into the storage area or display device.

The processing of the red text information and the white text information is similar to the processing of the black text information, and will not be repeated here. After the processing of the black text information, the red text information and the white text information is completed in sequence, a base picture, a black picture, a red picture and a white picture are stored in four storage areas of the flash memory, respectively.

Figure 3:
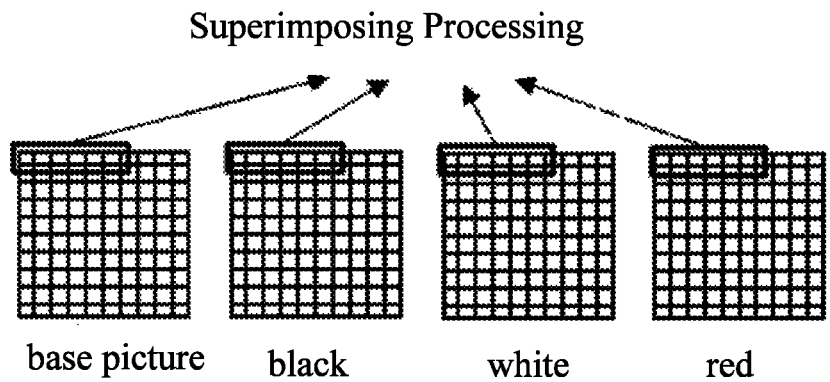
FIG. 3 is a schematic diagram of superimposing pictures according to an embodiment of the present disclosure.

When refreshing the EPD, as shown in FIG. 3, the base picture, black picture, red picture and white picture can be written to the EPD in sequence, and the pictures can be superimposed to obtain a final picture for display. Alternatively, synthesis may be performed according to color rules of the EPD. Each bit in the EPD represents two different colors of a pixel. Therefore, the base picture, the black-white pictures and the red-white pictures can be written to the EPD in sequence, and the pictures can be superimposed to obtain a final picture for display. For example, 16 bytes are read from the base picture, representing 64 pixels; then, 8 bytes are read from each of the black picture and white picture, representing 64 pixels; a new 8-byte array is constructed for writing black and white pictures into the EPD. Information of black and white pixels in 64 pixels represented by the 16 bytes read from the base picture, is first written into the newly constructed array. Then, 64 pixels represented by the 8 bytes read from each of the black picture and white picture, are written into the newly constructed array. Data written later will overwrite data written earlier. Then, the newly constructed array is written into the EPD, and this process will be repeated until all the pixels are written, thereby completing the writing of the base picture and the black-white pictures. After that, the above process are repeated as: 8 bytes are read from each of the red picture and white picture, representing 64 pixels; a new 8-byte array is constructed for writing red and white pictures into the EPD; then, 64 pixels represented by the 8 bytes read from each of the red picture and white picture, are written into the newly constructed array; the newly constructed array is then written into the EPD, and this process will be repeated until all the pixels are written, thereby completing the writing of the red-white pictures. After the red and white pictures are written, the final picture for display is obtained, thereby realizing the effect of superimposing texts on the base picture.

Figure 4:
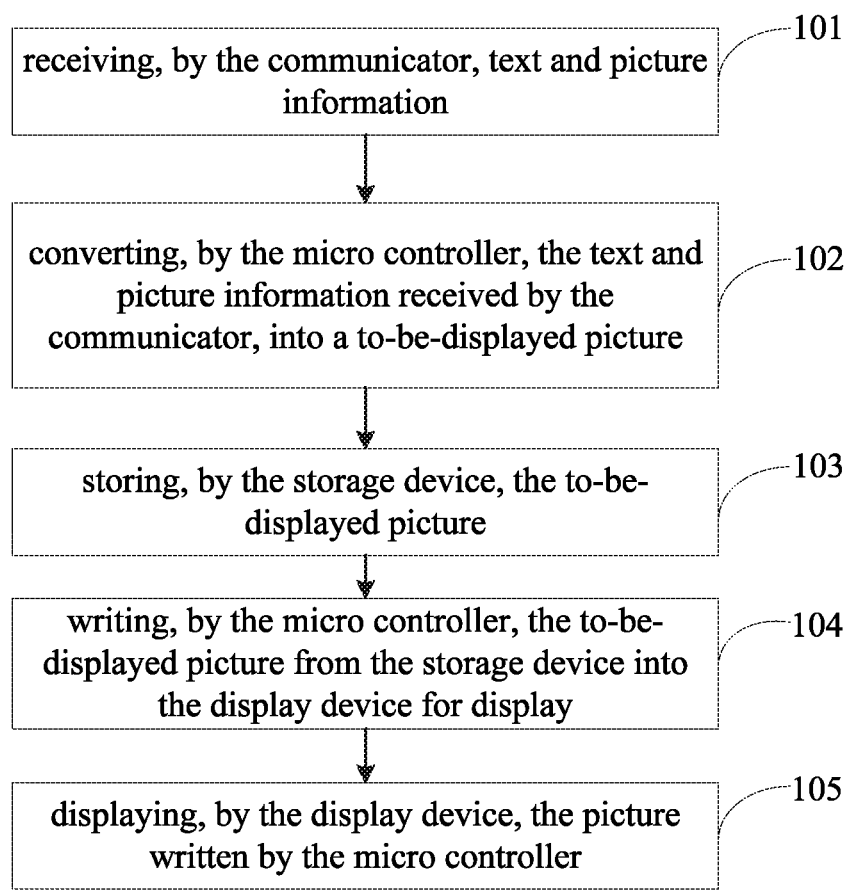
FIG. 4 is a schematic flowchart of a picture updating method for an IoT terminal according to an embodiment of the present disclosure.

On the other hand, one embodiment of the present disclosure provides a picture updating method for an IoT terminal, which may be the above IoT terminal. As shown in FIG. 4, the method includes:

Step 101: receiving, by the communicator 11, text and picture information;

Step 102: converting, by the micro controller 12, the text and picture information received by the communicator 11, into a to-be-displayed picture;

Step 103: storing, by the storage device 13, the to-be-displayed picture;

Step 104: writing, by the micro controller 12, the to-be-displayed picture from the storage device 13 into the display device 14 for display;

Step 105: displaying, by the display device 14, the picture written by the micro controller 12.

In this embodiment, the micro controller 12 converts the text and picture information received by the communicator 11 into a to-be-displayed picture, and stores the to-be-displayed picture in the storage device 13 outside the micro controller 12. After that, the micro controller 12 writes the to-be-displayed picture stored in the storage device 13 into the display device 14 for display. In this embodiment, the picture is stored in the storage device 13 outside the micro controller 12, and then the picture does not need to occupy resources of the micro controller 12, so that the micro controller 12 can complete processing of the picture with small resources.

The communicator 11 may be a radio frequency chip, which may communicate with a gateway wirelessly and receive text and picture information via interaction between the gateway and a server. The gateway can perform near-field wireless communication, has a wireless network or a wired network, and can connect to the server.

The storage device 13 is configured to storage information and cache information in the process of processing the text and picture information. The storage device 13 may adopt various types of storage devices. In some embodiments, the storage device 13 may adopt a flash memory, which can maintain the stored information for a long time without powering on. The flash memory is of electrically erasable programmable read-only memory (EEPROM) type, which has a high access speed, is easy to erase and rewrite, and consumes little power, and thus is suitable for IoT terminals with low power consumption requirements. Of course, the storage device 13 is not limited to using a flash memory, and the storage device 13 may also adopt other types of erasable and programmable storage devices.

In some embodiments, the display device 14 is an electronic ink screen. The power consumption of the electronic ink screen is very low, which is suitable for IoT terminals with low power consumption requirements. Of course, the display device 14 is not limited to using an electronic ink screen, and the display device 14 may adopt other types of low power consumption display devices.

Near-field wireless communication is mostly used between IoT terminals and gateways. Usually, the near-field wireless communication uses a lower frequency to expand the range of action, and the communication speed is slow, and thus information sent by the server-gateway is mostly text information. Then the MCU in the IoT terminal synthesizes base picture information and the text information, to display on the display device 14. Therefore, as shown in FIG. 1, the IoT terminal further includes a font library device 15 configured to store a first display array corresponding to the text information. The font library device 15 may read a first display array of corresponding information through ASCII codes and GB2312 codes of a character or text. The first display array is configured to indicate how many pixels of the display device need to display a character or text, and whether these pixels are lit when displaying the character or text. When displaying a character or text, many dots are combined in a certain way; and the font library device 15 can translate different characters or texts into a dot array, i.e., first display array.

In this embodiment, the micro controller 12 may be coupled with the communicator 11 through a serial peripheral interface. The micro controller 12 may be coupled with the storage device 13 through a serial peripheral interface (SPI). The micro controller 12 may be coupled with the display device 14 through a serial peripheral interface. The micro controller 12 may be coupled with the font library device 15 through a serial peripheral interface. The serial peripheral interface is a synchronous peripheral interface, which enables the micro controller 12 to communicate with various peripheral devices in a serial manner to exchange information.

In some embodiments, the text and picture information includes base picture information and text information of at least one color. The base picture information represents a basic picture, which can display graphics and texts in different colors. Texts and graphics in different colors can be displayed at different positions of the base picture, thereby realizing display of information. The base picture information is usually fixed, and has a very small probability of being changed. A picture can be updated by updating text information on the base picture subsequently. The text information of at least one color is text information that needs to be updated subsequently, and the text information may include texts and graphics.

In some embodiments, the method specifically includes:
respectively receiving, by the communicator, at least one of the base picture information and the text information of at least one color;
converting, by the micro controller, the received text information of at least one color into at least one monochrome picture correspondingly, and converting the received base picture information into a base picture;
storing, by the storage device, the base picture and the at least one monochrome picture; where storage areas corresponding to the base picture and the at least one monochrome picture in the storage device are independent of each other, and storage areas corresponding to different monochrome pictures in the at least one monochrome picture are independent of each other;
respectively reading, by the micro controller, the base picture and the at least one monochrome picture from the corresponding storage areas in the storage device, synthesizing the base picture and the at least one monochrome picture into a to-be-displayed picture, and writing the to-be-displayed picture into the display device for display.

In some embodiments, for any one color of the text information of at least one color, the micro controller stores the text information received by the communicator in the RAM, and processes, one by one, all characters in the any one color of the text information of at least one color, to obtain a monochrome picture of the any one color of the text information of at least one color;
for each character, the micro controller obtains a first display array corresponding to the character through the font library device, converts the first display array into a two-dimensional matrix with m rows and n columns, and writes the two-dimensional matrix into storage areas of corresponding colors in the storage device according to each row or each column in turn;
where elements of the two-dimensional matrix are binary; the last column is 0 when writing the two-dimensional matrix according to each row, or the last row is 0 when writing the two-dimensional matrix according to each column; and an order of a pixel of the display device corresponding to a starting element of the two-dimensional matrix, along a scanning direction for writing data into the display device, is q times 8, n and m are positive integers, and q is a natural number.

In some embodiments, the method specifically includes:
converting, by the micro controller, a display array corresponding to the character into an initial two-dimensional matrix with m rows and n columns, where elements of the initial two-dimensional matrix are binary; in case that a row coordinate k of a pixel of the display device corresponding to a starting element of the initial two-dimensional matrix, is not an integer multiple of 8, moving positions of pixels of the display device corresponding to all elements of the initial two-dimensional matrix by n1 pixels to the right as a whole, and filling n1 columns with all 0 elements before the initial two-dimensional matrix and filling (8-n1) columns with all 0 elements after the initial two-dimensional matrix, thereby obtaining the final two-dimensional matrix, where n1 is a remainder of dividing k by 8.

In some embodiments, the method specifically includes:
reading, by the micro controller, according to each row or each column of the two-dimensional matrix, elements in the two-dimensional matrix corresponding to M pixels, from the storage areas corresponding to different monochrome pictures in the at least one monochrome picture, and writing the elements in the two-dimensional matrix corresponding to M pixels into the M pixels of the display device, where M is a positive integer.

In a specific example, the storage device 13 adopts a flash memory, and the IoT terminal is a bedside card as shown in FIG. 2. As shown in FIG. 2, the bedside card is divided into several areas, including: an area with black characters on a white background, an area with white characters on a red background, an area with black characters on a white background, and an area with red characters on a white background. The characteristic of the flash memory is that once it is written, it cannot be erased; when it is erased, it must be erased as a whole. Therefore, in this embodiment, a color separation processing method is adopted, so that text and picture information of the bedside card is divided into base picture information and three-color text information. The base picture information includes a white background area and a red background area. The three-color text information includes black text information, white text information and red text information. Correspondingly, the flash memory is divided into four storage areas, which are respectively configured to store the base picture information, the black text information, the white text information and the red text information.

The bedside card can interact with a gateway and a server through the communicator 11, and receive information issued by the server and the gateway. The information issued by the server and the gateway to the bedside card is divided into base picture information and text information. When the server and gateway send the base picture information, the bedside card enters a base picture receiving mode and directly stores the base picture information as a base picture in a corresponding storage area in the flash memory. Since the base picture information is usually fixed and has a very small probability of being changed, the bedside card mainly receives text information. When the server and gateway send text information, the bedside card enters a text information receiving mode, converts the text information into a to-be-displayed monochrome picture, and stores the converted monochrome picture in a corresponding storage area of the flash memory. For example, after the bedside card receives black text information, the bedside card can convert the black text information into a black picture and store it in a corresponding storage area in the flash memory; after the bedside card receives red text information, the bedside card can convert the red text information into a red picture and store it in a corresponding storage area in the flash memory; after the bedside card receives white text information, the bedside card can convert the white text information into a white picture and store it in a corresponding storage area in the flash memory.

The base picture includes three different colors: black, white and red, then every two bits in the base picture information can represent a color, for example, 00 means black, 01 means white, and 10 means red. For white pictures, black pictures and red pictures, each of them only includes one color, so one pixel can be represented by one bit for indicating whether the corresponding pixel displays this color. For example, for a white picture, when a bit corresponding to a pixel is 1, it means that the corresponding pixel displays white; and when a bit corresponding to a pixel is 0, it means that the corresponding pixel does not display white. For a black picture, when a bit corresponding to a pixel is 1, it means that the corresponding pixel displays black; when a bit corresponding to a pixel is 0, it means that the corresponding pixel does not display black. For a red picture, when a bit corresponding to a pixel is 1, it means that the corresponding pixel displays red; when a bit corresponding to a pixel is 0, it means that the corresponding pixel does not display red.

When the bedside card receives text information, the bedside card first erases the corresponding area in the flash memory, and then converts GB2312 codes of the text information into a two-dimensional matrix through the font library device 15. Then, the bedside card fine-tunes the two-dimensional matrix according to layout of the base picture to realize adjustment by bit, and then writes the adjusted two-dimensional matrix into the storage areas of the corresponding colors row by row. In this way, the text information of different colors is written into the storage areas of the corresponding colors, respectively.

Specifically, taking black text information as an example, when the MCU stores the received black text information in RAM, the MCU first processes a first character, i.e., according to GB2312 codes or ASCII codes of the character, obtaining a first display array of the character through an interface with the font library device 15, and converting the first display array into a two-dimensional matrix, where elements of the two-dimensional matrix are binary. For example, the first display array is:

$$
\begin{array}{ccc}
FF & 00 & 01 \\
FF & 00 & 01 \\
FF & 00 & 01
\end{array}
$$

The elements of the first display array are in hexadecimal. The converted initial two-dimensional matrix is:

$$
\begin{array}{ccc}
11111111 & 00000000 & 00000001 \\
11111111 & 00000000 & 00000001 \\
11111111 & 00000000 & 00000001
\end{array}
$$

The elements in the initial two-dimensional matrix are binary, and one bit corresponds to one pixel of the display device. When writing the two-dimensional matrix into the flash memory, it needs to be written in bytes. Therefore, the number of elements in each row or column should be a multiple of 8. If the number of elements in each row or column is not a multiple of 8, the first display array needs to be expanded. For example, for an initial two-dimensional matrix with m rows and n columns, when horizontal scanning is used in the EPD, in case that a row coordinate k of a pixel of the display device corresponding to a starting element of the initial two-dimensional matrix, is calculated according to layout information and is not an integer multiple of 8, the elements of the initial two-dimensional matrix are moved to the right by n bits to form a new two-dimensional matrix. The new two-dimensional matrix is divided into m second display arrays by row, and the m second display arrays are written into storage areas of corresponding colors in the flash memory, respectively. At this point, the processing of the first character is completed. And so on, after all characters are processed, a black picture is obtained.

For example, a first display array is:

$$
\begin{array}{cc}
0X3F & 0X00 \\
0X0F & 0X00 \\
0X0F & 0X00 \\
0X0F & 0X00 \\
0X0F & 0X00 \\
0XFF & 0XF0
\end{array}
$$

Where 0X is hexadecimal; and the first display array is 6 rows and 2 columns, and can be used to display the character "1".

After converting the first display array into an initial two-dimensional matrix, the initial two-dimensional matrix is:

$$
\begin{array}{cc}
00111111 & 00000000 \\
00001111 & 00000000 \\
00001111 & 00000000 \\
00001111 & 00000000 \\
00001111 & 00000000 \\
11111111 & 11110000
\end{array}
$$

Where each bit corresponds to one pixel of the display device.

An element "0" in the first row and first column of the initial two-dimensional matrix is a starting element of the initial two-dimensional matrix. According to layout information, when displaying, in case that a horizontal coordinate of a pixel corresponding to the starting element is an integer multiple of 8, when being written to the storage area or display device, the hexadecimal display array can be directly written in rows. For example, coordinates of a pixel corresponding to the starting element in the display device are (8, 1), when being written to the storage area or display device, the hexadecimal display array can be directly written in rows. Then, coordinates of a starting pixel of the display device are (0,0).

According to layout information, when displaying, in case that a horizontal coordinate k of a pixel corresponding to the starting element of the initial two-dimensional matrix is not an integer multiple of 8, elements of the initial two-dimensional matrix need to be shifted to the right. For example, k=10, the elements of the initial two-dimensional matrix need to be shifted to the right by 2 bits as a whole, with filling 2 columns with all 0 elements before the initial two-dimensional matrix and filling 6 columns with all 0 elements after the initial two-dimensional matrix, thereby obtaining a new two-dimensional matrix as shown in FIG. 5. When the new two-dimensional matrix is expressed in hexadecimal, it can be expressed as a display array shown in the right half of FIG. 5. When being written to the storage area or display device, the display array shown in the right half of FIG. 5 can be directly written by rows, into the storage area or display device.

The processing of the red text information and the white text information is similar to the processing of the black text information, and will not be repeated here. After the processing of the black text information, the red text information and the white text information is completed in sequence, a base picture, a black picture, a red picture and a white picture are stored in four storage areas of the flash memory, respectively.

When refreshing the EPD, as shown in FIG. 3, the base picture, black picture, red picture and white picture can be written to the EPD in sequence, and the pictures can be superimposed to obtain a final picture for display. Alternatively, synthesis may be performed according to color rules of the EPD. Each bit in the EPD represents two different colors of a pixel. Therefore, the base picture, the black-white pictures and the red-white pictures can be written to the EPD in sequence, and the pictures can be superimposed to obtain a final picture for display. For example, 16 bytes are read from the base picture, representing 64 pixels; then, 8 bytes are read from each of the black picture and white picture, representing 64 pixels; a new 8-byte array is constructed for writing black and white pictures into the EPD. Information of black and white pixels in 64 pixels represented by the 16 bytes read from the base picture, is first written into the newly constructed array. Then, 64 pixels represented by the 8 bytes read from each of the black picture and white picture, are written into the newly constructed array. Data written later will overwrite data written earlier. Then, the newly constructed array is written into the EPD, and this process will be repeated until all the pixels are written, thereby completing the writing of the base picture and the black-white pictures. After that, the above process are repeated as: 8 bytes are read from each of the red picture and white picture, representing 64 pixels; a new 8-byte array is constructed for writing red and white pictures into the EPD; then, 64 pixels represented by the 8 bytes read from each of the red picture and white picture, are written into the newly constructed array; the newly constructed array is then written into the EPD, and this process will be repeated until all the pixels are written, thereby completing the writing of the red-white pictures. After the red and white pictures are written, the final picture for display is obtained, thereby realizing the effect of superimposing texts on the base picture.

In the method embodiments of the present disclosure, sequence numbers of the steps are not used to limit sequence of the steps. For those of ordinary skill in the art, sequential changes of steps without creative work are also within the protection scope of the present disclosure.

It should be noted that each embodiment in this specification is described in a progressive manner, and the same and similar parts between the various embodiments may be referred to each other, and each embodiment focuses on the differences from other embodiments. Especially, for the method embodiment, since it is basically similar to the product embodiment, the description is relatively simple, and the relevant part may refer to the description of the product embodiment.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Such words as "comprises" or "include" mean that an element or object appearing before the word covers elements or objects listed after the word and their equivalents, but do not exclude other elements or objects. Similarly, such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

It will be understood that when an element such as a layer, film, region, or substrate is referred to as being "on" or "under" another element, this element may be "directly" on or "under" the other element, or, there may be an intermediate element therebetween.

In the description of the above embodiments, specific features, structures, materials or characteristics may be combined in any suitable manner in any one or more embodiments or examples.

The above are merely the embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure. The protection scope of the present disclosure shall be subject to the protection scope of the claims.

What is claimed is:

1. An Internet of Things (IoT) terminal, comprising:
   a communicator configured to receive text and picture information;
   a micro controller coupled with the communicator and configured to convert the text and picture information into a to-be-displayed picture;
   a storage device coupled with the micro controller and configured to store the to-be-displayed picture; and
   a display device coupled with the micro controller;
   wherein the micro controller is further configured to read the to-be-displayed picture from the storage device and write the to-be-displayed picture into the display device for display;
   wherein the text and picture information includes base picture information and text information of at least one color;
   the communicator is specifically configured to respectively receive at least one of the base picture information and the text information of at least one color;
   the micro controller is configured to convert the received text information of at least one color into at least one monochrome picture, and convert the received base picture information into a base picture;

the storage device is specifically configured to store the base picture and the at least one monochrome picture; wherein storage areas corresponding to the base picture and the at least one monochrome picture in the storage device are independent of each other, and storage areas corresponding to different monochrome pictures in the at least one monochrome picture are independent of each other;

the micro controller is further specifically configured to respectively read the base picture and the at least one monochrome picture from the corresponding storage areas in the storage device, synthesize the base picture and the at least one monochrome picture into the to-be-displayed picture, and write the to-be-displayed picture into the display device for display;

wherein the IoT terminal further includes a font library device coupled with the micro controller; the font library device stores a first display array corresponding to a character; the font library device is configured to receive the character input by the micro controller, and output the first display array corresponding to the character;

wherein the micro controller further includes a RAM, and the micro controller is specifically configured to, for any one color of the text information of at least one color, store the text information received by the communicator in the RAM, and process, one by one, all characters in the any one color of the text information of at least one color, to obtain a monochrome picture of the any one color of the text information of at least one color via convention;

for each character, obtain a first display array corresponding to the character through the font library device, convert the first display array into a two-dimensional matrix with m rows and n columns, and sequentially write the two-dimensional matrix into storage areas of corresponding colors in the storage device according to each row or each column;

wherein elements of the two-dimensional matrix are binary; a last column is 0 along a scanning direction for writing data into the display device; and an order of a pixel of the display device corresponding to a starting element of the two-dimensional matrix, along the scanning direction for writing data into the display device, is q times 8, n and m are positive integers, and q is a natural number.

2. The IoT terminal according to claim 1, wherein the micro controller is further specifically configured to, convert a display array corresponding to the character into an initial two-dimensional matrix with m rows and n columns, wherein elements of the initial two-dimensional matrix are binary; in case that a row coordinate k of a pixel of the display device corresponding to a starting element of the initial two-dimensional matrix, is not an integer multiple of 8, move positions of pixels of the display device corresponding to all elements of the initial two-dimensional matrix by n1 pixels to the right as a whole, and filling n1 columns with all 0 elements before the initial two-dimensional matrix and filling (8-n1) columns with all 0 elements after the initial two-dimensional matrix, obtaining the final two-dimensional matrix, wherein n1 is a remainder of dividing k by 8.

3. The IoT terminal according to claim 1, wherein the micro controller is further configured to read, according to each row or each column of the two-dimensional matrix, elements in the two-dimensional matrix corresponding to M pixels, from the storage areas corresponding to different monochrome pictures in the at least one monochrome picture, and write the elements in the two-dimensional matrix corresponding to M pixels into the M pixels of the display device, wherein M is a positive integer.

4. The IoT terminal according to claim 1, wherein
the micro controller is coupled with the communicator through a serial peripheral interface; and/or,
the micro controller is coupled with the storage device through a serial peripheral interface; and/or,
the micro controller is coupled with the display device through a serial peripheral interface; and/or,
the micro controller is coupled with the font library device through a serial peripheral interface.

5. The IoT terminal according to claim 1, wherein the storage device adopts a flash memory.

6. The IoT terminal according to claim 1, wherein the display device is an electronic ink screen.

7. A picture updating method for an IoT terminal according to claim 1, comprising:
receiving, by the communicator, text and picture information;
converting, by the micro controller, the text and picture information received by the communicator, into a to-be-displayed picture;
storing, by the storage device, the to-be-displayed picture;
writing, by the micro controller, the to-be-displayed picture from the storage device into the display device for display; and
displaying, by the display device, the picture written by the micro controller.

8. The method according to claim 7, wherein the text and picture information includes base picture information and text information of at least one color; the method includes:
respectively receiving, by the communicator, at least one of the base picture information and the text information of at least one color;
converting, by the micro controller, the received text information of at least one color into at least one monochrome picture correspondingly, and converting the received base picture information into a base picture;
storing, by the storage device, the base picture and the at least one monochrome picture; wherein storage areas corresponding to the base picture and the at least one monochrome picture in the storage device are independent of each other, and storage areas corresponding to different monochrome pictures in the at least one monochrome picture are independent of each other;
respectively reading, by the micro controller, the base picture and the at least one monochrome picture from the corresponding storage areas in the storage device, synthesizing the base picture and the at least one monochrome picture into the to-be-displayed picture, and writing the to-be-displayed picture into the display device for display.

9. The method according to claim 8, wherein the method includes:
for any one color of the text information of at least one color, storing, by the micro controller, the text information received by the communicator in the RAM, and processing, one by one, all characters in the any one color of the text information of at least one color, to obtain a monochrome picture of the any one color of the text information of at least one color;
for each character, obtaining, by the micro controller, a first display array corresponding to the character through the font library device, converting the first display array into a two-dimensional matrix with m rows and n columns, and writing the two-dimensional matrix into storage areas of corresponding colors in the storage device according to each row or each column in turn;

wherein elements of the two-dimensional matrix are binary; a last column is 0 when writing the two-dimensional matrix according to each row, or a last row is 0 when writing the two-dimensional matrix according to each column; and an order of a pixel of the display device corresponding to a starting element of the two-dimensional matrix, along a scanning direction for writing data into the display device, is q times 8, n and m are positive integers, and q is a natural number.

10. The method according to claim 9, wherein the method includes:

converting, by the micro controller, a display array corresponding to the character into an initial two-dimensional matrix with m rows and n columns, wherein elements of the initial two-dimensional matrix are binary; in case that a row coordinate k of a pixel of the display device corresponding to a starting element of the initial two-dimensional matrix, is not an integer multiple of 8, moving positions of pixels of the display device corresponding to all elements of the initial two-dimensional matrix by n1 pixels to the right as a whole, and filling n1 columns with all 0 elements before the initial two-dimensional matrix and filling (8-n1) columns with all 0 elements after the initial two-dimensional matrix, thereby obtaining the final two-dimensional matrix, wherein n1 is a remainder of dividing k by 8.

11. The method according to claim 8, wherein the method includes:

reading, by the micro controller, according to each row or each column of the two-dimensional matrix, elements in the two-dimensional matrix corresponding to M pixels, from the storage areas corresponding to different monochrome pictures in the at least one monochrome picture, and writing the elements in the two-dimensional matrix corresponding to M pixels into the M pixels of the display device, wherein M is a positive integer.

* * * * *